(12) United States Patent
Kodama

(10) Patent No.: US 11,268,611 B2
(45) Date of Patent: Mar. 8, 2022

(54) DRIVING MACHINE MODULE

(71) Applicant: MITSUBISHI HEAVY INDUSTRIES COMPRESSOR CORPORATION, Tokyo (JP)

(72) Inventor: Naoki Kodama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 357 days.

(21) Appl. No.: 16/474,431

(22) PCT Filed: Feb. 6, 2017

(86) PCT No.: PCT/JP2017/004189
§ 371 (c)(1),
(2) Date: Jun. 27, 2019

(87) PCT Pub. No.: WO2018/142608
PCT Pub. Date: Aug. 9, 2018

(65) Prior Publication Data
US 2021/0285535 A1 Sep. 16, 2021

(51) Int. Cl.
*F16H 57/04* (2010.01)
*F16H 57/025* (2012.01)
*F16M 5/00* (2006.01)

(52) U.S. Cl.
CPC ....... *F16H 57/0453* (2013.01); *F16H 57/025* (2013.01); *F16M 5/00* (2013.01)

(58) Field of Classification Search
CPC ............... F16H 57/025; F16H 57/0453; F16H 2057/0228; F16H 2057/0227; F16H 2057/02021; F16M 5/00; B63H 21/305
See application file for complete search history.

(56) References Cited

U.S. PATENT DOCUMENTS 3,330,514 A 7/1967 Williams
6,449,957 B1 * 9/2002 Takamatsu ............. F01D 15/10
60/796

(Continued)

FOREIGN PATENT DOCUMENTS

DE 102009007563 A1 8/2010
JP S62-188853 A 8/1987

(Continued)

OTHER PUBLICATIONS

International Search Report and Written Opinion in corresponding International Application No. PCT/JP2017/004189, dated Apr. 25, 2017 (9 pages).

*Primary Examiner* — Daniel D Yabut
(74) *Attorney, Agent, or Firm* — Osha Bergman Watanabe & Burton LLP

(57) ABSTRACT

A compressor module is provided with: a driving machine that has an output shaft driven to rotate about an axis; a gear part having at least a first gear that rotates integrally with the output shaft and a second gear that rotates integrally with an input shaft of a load device; a storage tank that is arranged below the gear part in the vertical direction so as to support the gear part and that stores lubricating oil; a base plate that supports the driving machine and the storage tank; and a gear support part that supports the gear part with respect to the storage tank so as to be relatively movable in a horizontal direction orthogonal to the vertical direction.

17 Claims, 5 Drawing Sheets

(56) References Cited

U.S. PATENT DOCUMENTS

| | | | |
|---|---|---|---|
| 2001/0003242 A1 | 6/2001 | Takamatsu et al. | |
| 2015/0144763 A1 | 5/2015 | Aeffner | |
| 2015/0207380 A1 | 7/2015 | Taketomi et al. | |
| 2016/0102581 A1 | 4/2016 | Del Bono | |
| 2017/0241293 A1* | 8/2017 | Zaffino | F01D 25/28 |
| 2018/0145559 A1* | 5/2018 | Johnson | F02B 63/044 |

FOREIGN PATENT DOCUMENTS

| | | |
|---|---|---|
| JP | H11-062621 A | 3/1999 |
| WO | 2014034594 A1 | 3/2014 |

\* cited by examiner

DRIVING MACHINE MODULE

TECHNICAL FIELD

The present invention relates to a driving machine module.

BACKGROUND ART

In a marine facility such as a ship, a driving machine module is used in which a load device such as a compressor compressing gas such as air and gas and a driving machine such as a motor and a turbine driving the load device are integrally installed on a base plate. In this type of driving machine module, a gear part constituting a decelerator or a speed increaser may be provided between an output shaft of the driving machine and an input shaft of the load device.

The driving machine module is provided with a storage tank collecting and temporarily storing lubricating oil used in the load device, the driving machine, and the gear part. For example, Patent Document 1 discloses a configuration in which the storage tank is arranged on an outside surface of the base plate on which the load device, the driving machine, and the gear part are mounted.

CITATION LIST

Patent Literature

[Patent Document 1] United States Patent Application, Publication No. 2016/0102581

SUMMARY OF INVENTION

Technical Problem

Desirably, this type of driving machine module needs to be reduced in size. In the configuration that is disclosed in Patent Document 1; however, the storage tank is arranged on the outside surface of the base plate, and thus the storage tank laterally protrudes to hinder a reduction in driving machine module size.

The present invention provides a driving machine module that can be reduced in size.

Solution to Problem

A driving machine module according to a first aspect of the present invention includes a driving machine having an output shaft driven to rotate about an axis, a gear part having at least a first gear rotating integrally with the output shaft and a second gear which rotates integrally with an input shaft of a load device as a driving object and to which the rotation of the first gear is transmitted, a storage tank arranged below the gear part in a vertical direction so as to support the gear part and storing lubricating oil used in the driving machine and the gear part, a base plate supporting the driving machine and the storage tank, and a gear support part supporting the gear part with respect to the storage tank so as to be relatively movable in a horizontal direction orthogonal to the vertical direction.

According to this configuration, the storage tank is arranged below the gear part, and thus the driving machine module can be reduced in size. During operation of the driving machine module, lubricating oil raised in temperature due to the frictional heat of the gear or the like flows into the storage tank. As a result, the temperature of the storage tank itself rises and the storage tank generates thermal elongation. The thermal elongation of the storage tank may lead to a shift in the position of the equipment of the gear part installed above the storage tank. However, even in the event of the thermal elongation attributable to the inflow of the temperature-raised lubricating oil and the rise in the temperature of the storage tank, the gear support part suppresses deformation of the storage tank and a movement of the gear part in the horizontal direction.

In the driving machine module of a second aspect of the present invention according to the first aspect, the gear support part includes a gear key member provided in one of the gear part and the storage tank and extending in the vertical direction and a gear guide groove formed in the other of the gear part and the storage tank, the gear key member being inserted into the gear guide groove. The gear guide groove is configured to guide a movement of the inserted gear key member in the horizontal direction.

According to this configuration, the gear key member slides along the gear guide groove once the storage tank is deformed in the horizontal direction as a result of thermal elongation. Suppressed as a result is a shift in the position of the gear part that is attributable to the thermal elongation of the storage tank.

In the driving machine module of a third aspect of the present invention according to the second aspect, the gear support part includes a first gear support part where the gear guide groove extends in a first direction of the horizontal direction and a second gear support part where the gear guide groove extends in a second direction orthogonal to the first direction in the horizontal direction.

According to this configuration, it is possible to escape the deformation of the storage tank in a dispersed manner in the first direction and the second direction, and a shift in the position of the gear part that is attributable to the thermal elongation of the storage tank is stably suppressed.

In the driving machine module of a fourth aspect of the present invention according to the third aspect, the first gear support part may be arranged on an extension line of a rotation axis of the first gear or the second gear rotating at a high speed when viewed from above in the vertical direction and the first direction may be an axial direction in which the rotation axis extends.

According to this configuration, it is possible to escape deformation of the storage tank along the extension line of the rotation axis of the gear rotating at a high speed by means of the first gear support part. Suppressed as a result is the thermal elongation of the storage tank causing the positional relationship with respect to the storage tank around the gear rotating at a high speed to be shifted in the radial direction.

In the driving machine module of a fifth aspect of the present invention according to the third or fourth aspect, the second gear support part is arranged on an extension line of a center line in a gear width direction of the first gear or the second gear when viewed from above in the vertical direction and the second direction corresponds to a direction in which the center line extends.

According to this configuration, it is possible to escape deformation of the storage tank along the extension lines of the center lines of the first gear and the second gear by means of the second gear support part. By the second gear support part efficiently absorbing a positional shift as described above, it is possible to suppress an impact on engagement between the first gear and the second gear.

The driving machine module of a sixth aspect of the present invention according to any one of the second to fifth aspects includes a gear liner member arranged between the gear key member and the gear guide groove and having a smaller frictional force with respect to the gear guide groove than the gear key member.

According to this configuration, the gear key member is capable of smoothly moving along the gear guide groove in the gear support part. As a result, an impact attributable to the thermal elongation of the storage tank can be efficiently suppressed.

The driving machine module of a seventh aspect of the present invention according to the sixth aspect includes a gear shim member arranged between the gear liner member and the gear key member and pressing the gear liner member against an inner wall of the gear guide groove.

According to this configuration, by selecting the thickness of the gear shim member during assembly, it is possible to absorb dimensional errors occurring during machining and assembly and it is possible to easily install the gear key member in a state of being movable with respect to the gear guide groove.

The driving machine module of an eighth aspect of the present invention according to any one of the first to seventh aspects includes a tank support part supporting the storage tank with respect to the base plate so as to be relatively movable in the horizontal direction.

According to this configuration, the storage tank is capable of moving relative to the base plate and the gear part. As a result, it is possible to suppress, with high accuracy, a horizontal shift in the position of the gear part with respect to the driving machine and the load device that is attributable to the thermal elongation of the storage tank. Accordingly, the impact of the thermal elongation of the storage tank can be more effectively suppressed.

In the driving machine module of a ninth aspect of the present invention according to the eighth aspect, the tank support part includes a tank key member provided in one of the storage tank and the base plate and extending in the vertical direction and a tank guide groove formed in the other of the storage tank and the base plate, the tank key member being inserted into the tank guide groove. The tank guide groove is configured to guide a movement of the inserted tank key member in the horizontal direction.

According to this configuration, the tank key member slides along the tank guide groove once the storage tank is deformed in the horizontal direction as a result of thermal elongation. Suppressed as a result is a positional shift with respect to the base plate that is attributable to the thermal elongation of the storage tank.

In the driving machine module of a tenth aspect of the present invention according to the ninth aspect, the tank support part includes a first tank support part where the tank guide groove extends in a first direction of the horizontal direction and a second tank support part where the tank guide groove extends in a second direction orthogonal to the first direction in the horizontal direction.

According to this configuration, it is possible to escape the deformation of the storage tank in a dispersed manner in the first direction and the second direction, and an impact of the thermal elongation of the storage tank on the base plate is stably suppressed.

In the driving machine module of an eleventh aspect of the present invention according to the tenth aspect, the first tank support part is arranged on an extension line of a rotation axis of the first gear or the second gear rotating at a high speed when viewed from above in the vertical direction and the first direction is an axial direction in which the rotation axis extends.

According to this configuration, it is possible to escape deformation of the storage tank along the extension line of the rotation axis of the gear rotating at a high speed by means of the first tank support part. Suppressed as a result is the thermal elongation of the storage tank causing the positional relationship with respect to the base plate around the gear rotating at a high speed to be shifted in the radial direction.

In the driving machine module of a twelfth aspect of the present invention according to the tenth or eleventh aspect, the second tank support part is arranged on an extension line of a center line in a gear width direction of the first gear or the second gear when viewed from above in the vertical direction and the second direction corresponds to a direction in which the center line extends.

According to this configuration, it is possible to escape deformation of the storage tank along the extension lines of the center lines of the first gear and the second gear by means of the second tank support part. By the second tank support part efficiently absorbing a positional shift as described above, it is possible to suppress an impact on engagement between the first gear and the second gear.

The driving machine module of a thirteenth aspect of the present invention according to any one of the ninth to twelfth aspects includes a tank liner member arranged between the tank key member and the tank guide groove and having a smaller frictional force with respect to the tank guide groove than the tank key member.

According to this configuration, the tank key member is capable of smoothly moving along the tank guide groove in the tank support part. As a result, an impact attributable to the thermal elongation of the storage tank can be efficiently suppressed.

The driving machine module of a fourteenth aspect of the present invention according to the thirteenth aspect may include a tank shim member arranged between the tank liner member and the tank key member and pressing the tank liner member against an inner wall of the tank guide groove.

According to this configuration, by selecting the thickness of the tank shim member during assembly, it is possible to absorb dimensional errors occurring during machining and assembly and it is possible to easily install the tank key member in a state of being movable with respect to the tank guide groove.

In the driving machine module of a fifteenth aspect of the present invention according to any one of the first to fourteenth aspects, the storage tank is provided with a partition plate extending in the vertical direction and partitioning an inside of the storage tank, between an upper surface and a lower surface of the storage tank. The gear part may be arranged above the partition plate in the vertical direction.

According to this configuration, the load of the gear part is also supported by the partition plate in the storage tank, and thus the gear part can be firmly supported.

In the driving machine module of a sixteenth aspect of the present invention according to any one of the first to fifteenth aspects, the base plate is supported at three points on an installation surface.

According to this configuration, it is possible to suitably install the driving machine module on, for example, a deck of a ship where shaking occurs.

The driving machine module of a seventeenth aspect of the present invention according to any one of the first to sixteenth aspects may include a compressor as the load device.

According to this configuration, it is possible to suppress an impact of thermal elongation of the storage tank and it is possible to suppress misalignment of the gear part with respect to the driving machine and the compressor in the driving machine module integrally provided with the compressor.

A driving machine module according to an eighteenth aspect of the present invention includes a driving machine having an output shaft driven to rotate about an axis, a gear part having at least a first gear rotating integrally with the output shaft and a second gear which rotates integrally with an input shaft of a load device as a driving object and to which the rotation of the first gear is transmitted, a storage tank arranged below the gear part in a vertical direction so as to support the gear part and storing lubricating oil used in the driving machine and the gear part, and a base plate supporting the driving machine and the storage tank.

According to this configuration, the storage tank is arranged below the gear part, and thus the driving machine module can be reduced in size.

Advantageous Effects of Invention

Size reduction can be achieved according to the present invention.

DESCRIPTION OF EMBODIMENTS

Hereinafter, a compressor module 1 of the present invention will be described with reference to accompanying drawings.

Figure 1:
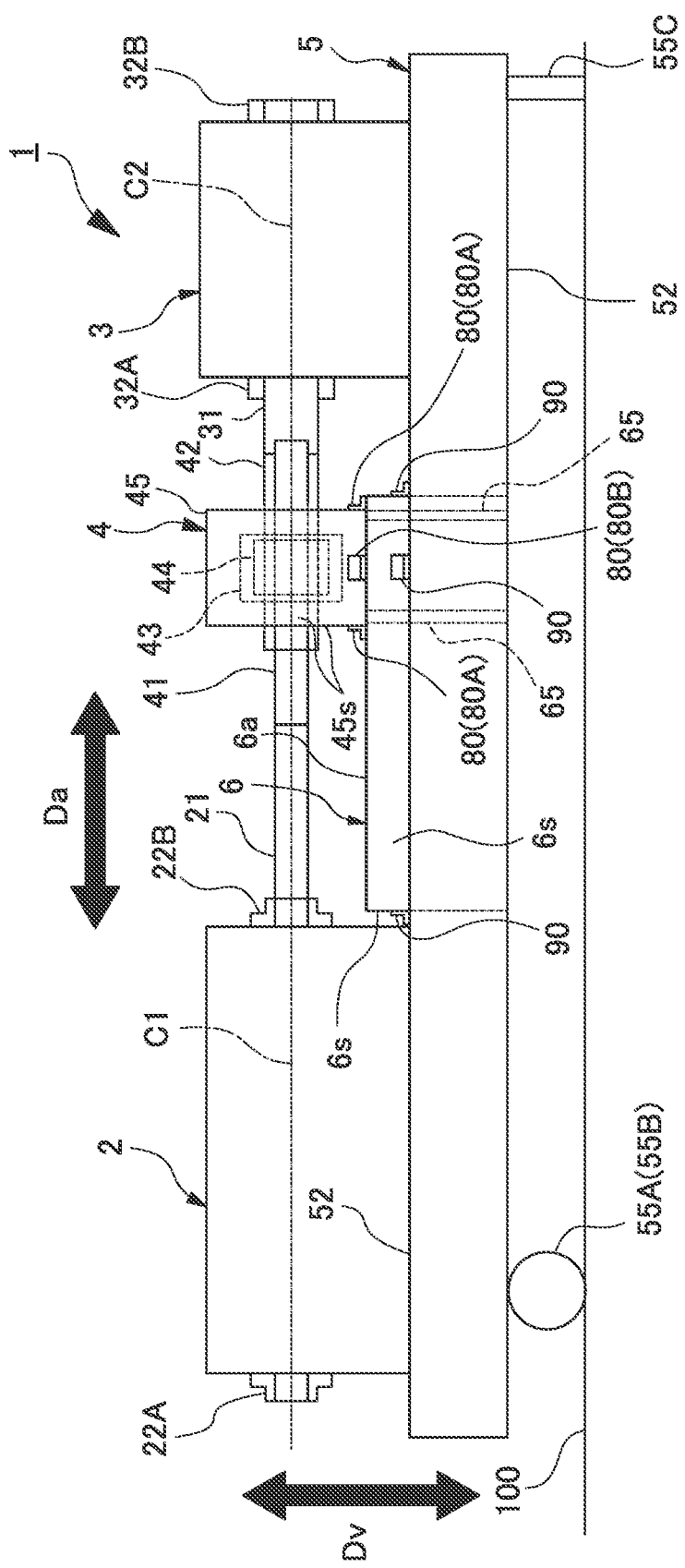
FIG. 1 is a side view showing the configuration of a compressor module according to an embodiment of this invention.
Figure 2:
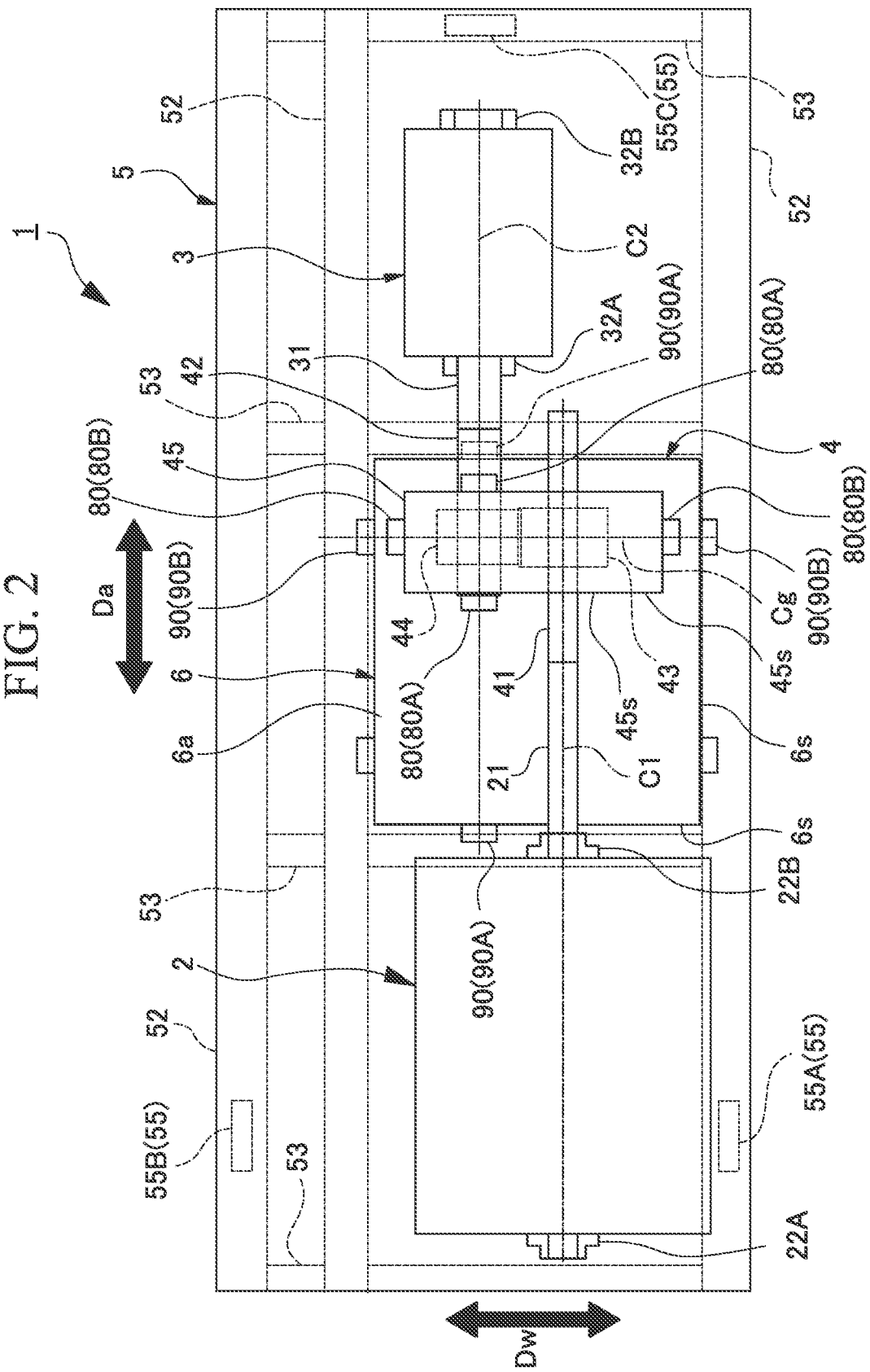
FIG. 2 is a plan view of the compressor module according to the embodiment of this invention.

As shown in FIGS. 1 and 2, the compressor module (driving machine module) 1 is provided with a driving machine 2, a compressor (load device) 3, a transmission (gear part) 4, a base plate 5, and a storage tank 6.

The driving machine 2 is connected to the compressor 3 via the transmission 4. The driving machine 2 drives the compressor 3. The driving machine 2 of the present embodiment is an electric motor. The driving machine 2 has an output shaft 21 that is driven to rotate about a first axis (axis) C1. The driving machine 2 has a first drive bearing 22A and a second drive bearing 22B that rotatably support the output shaft 21 about the first axis C1.

In the present embodiment, a direction orthogonal to a vertical direction Dv is referred to as a horizontal direction. The horizontal direction in which the first axis C1 extends is referred to as an axial direction (first direction) Da. The horizontal direction that is orthogonal to the axial direction Da and the vertical direction Dv is referred to as a width direction (second direction) Dw.

The compressor 3 is a load device and is a driving object driven by the driving machine 2. Rotation of the output shaft 21 is transmitted to the compressor 3 via the transmission 4. The compressor 3 has a rotor (input shaft) 31 connected to the transmission 4. The rotor 31 is rotated about a second axis C2. The compressor 3 has a first compression bearing 32A and a second compression bearing 32B that rotatably support the rotor 31 about the second axis C2. The second axis C2 in the present embodiment is parallel to the first axis C1 and extends at a position shifted in the width direction Dw with respect to the first axis C1.

The compressor 3 is driven by the rotation of the output shaft 21 being transmitted to the rotor 31 via the transmission 4. The compressor 3 generates a compressed fluid by compressing a working fluid taken in by the rotor 31 rotating. Here, the application of the compressed fluid generated by the compressor 3 is not limited at all.

The transmission 4 transmits rotation of the driving machine 2 to the compressor 3. The transmission 4 of the present embodiment is a speed increaser that accelerates the rotation of the output shaft 21 of the driving machine 2 and transmits the accelerated rotation to the rotor 31. The transmission 4 is arranged so as to be sandwiched between the driving machine 2 and the compressor 3 in the axial direction Da. The transmission 4 of the present embodiment has a transmission input shaft 41, a transmission output shaft 42, a first gear 43, a second gear 44, and a gear case 45.

The transmission input shaft 41 is connected to the output shaft 21. The transmission input shaft 41 is rotated about the first axis C1 integrally with the output shaft 21. The transmission output shaft 42 is connected to the rotor 31. The transmission output shaft 42 is rotated about the second axis C2 integrally with the rotor 31.

The first gear 43 is connected to the transmission input shaft 41. The first gear 43 is rotated integrally with the output shaft 21 via the transmission input shaft 41.

The second gear 44 is connected to the transmission output shaft 42. The second gear 44 is rotated integrally with the rotor 31 via the transmission output shaft 42. The second gear 44 meshes with the first gear 43, and rotation of the first gear 43 is transmitted to the second gear 44. Since the transmission 4 of the present embodiment is a speed increaser, the second gear 44 rotates at a higher speed than the first gear 43.

The gear case 45 has a rectangular parallelepiped shape. The first gear 43 and the second gear 44 are accommodated in the gear case 45. Also accommodated in the gear case 45 are the end part of the transmission input shaft 41 provided with the first gear 43 and the end part of the transmission output shaft 42 provided with the second gear 44.

The transmission 4 accelerates the rotation that is input from the transmission input shaft 41 connected to the output shaft 21 via the first gear 43 and the second gear 44 and transmits the accelerated rotation to the rotor 31 connected to the transmission output shaft 42.

The base plate 5 supports the driving machine 2, the compressor 3, the transmission 4, and the storage tank 6. The base plate 5 of the present embodiment has a plurality of beam parts 52 and a connecting member 53.

The plurality of beam parts 52 are provided at intervals in the width direction Dw of the base plate 5. Each beam part 52 extends in the axial direction Da over the entire length of the base plate 5 in the axial direction Da. The beam part 52 of the present embodiment is formed of carbon steel.

The connecting member 53 interconnects the plurality of beam parts 52, which are arranged in parallel at intervals in the width direction Dw. Each connecting member 53 extends in the width direction Dw. A plurality of the connecting members 53 are provided at intervals in the axial direction Da. The connecting member 53 of the present embodiment is formed of carbon steel.

The base plate 5 having these beam parts 52 and connecting members 53 directly supports the driving machine 2 and the compressor 3 from below in the vertical direction Dv. The base plate 5 accommodates the storage tank 6 in the space inside the base plate 5 that is surrounded by the plurality of beam parts 52 and the plurality of connecting members 53. The base plate 5 indirectly supports the storage tank 6 with respect to the beam part 52 and the connecting member 53 via a tank support part 90 (described later).

The base plate 5 is installed on an installation surface 100 such as a deck of a ship. The base plate 5 has three leg members 55 on the lower surface of the base plate 5. In the present embodiment, the base plate 5 has a first leg member 55A, a second leg member 55B, and a third leg member 55C as the leg members 55.

The first leg member 55A is fixed to the base plate 5. The second leg member 55B is provided so as to be slidable in the width direction Dw. The third leg member 55C is provided so as to be slidable in the axial direction Da. As a result, in a case where the installation surface 100 of the deck or the like undergoes distortion attributable to shaking of the ship caused by waves and wind, thermal elongation attributable to a change in temperature, vibration generated during operation of the driving machine 2 and the compressor 3, and the like, the leg member 55 keeps the distortion, the thermal elongation, the vibration, and the like from affecting the base plate 5.

The storage tank 6 stores lubricating oil used in the driving machine 2, the transmission 4, and the compressor 3. The storage tank 6 has a hollow rectangular parallelepiped shape. The lubricating oil is used in, for example, the first drive bearing 22A and the second drive bearing 22B of the driving machine 2, the inside of the transmission 4, and the first compression bearing 32A and the second compression bearing 32B of the compressor. The storage tank 6 of the present embodiment is connected to each of the first drive bearing 22A and the second drive bearing 22B of the driving machine 2, the inside of the transmission 4, and the first compression bearing 32A and the second compression bearing 32B of the compressor through piping (not shown).

The lubricating oil stored in the storage tank 6 is pumped toward the driving machine 2, the transmission 4, and the compressor 3 through the piping (not shown) by a feed pump (not shown). The piping (not shown) is provided with, for example, an oil cooler cooling the lubricating oil sent from the feed pump and an oil filter removing foreign substances such as dust from the lubricating oil sent from the oil cooler.

The storage tank 6 is arranged below the transmission 4 in the vertical direction Dv and supports the transmission 4. The storage tank 6 has a larger shape than the transmission 4 when viewed from above in the vertical direction Dv. Accordingly, the transmission 4 is provided so as to fit on an upper surface 6a of the storage tank 6. The transmission 4 of the present embodiment is indirectly attached to the upper surface 6a of the storage tank 6 via a gear support part 80 (described later).

Figure 3:
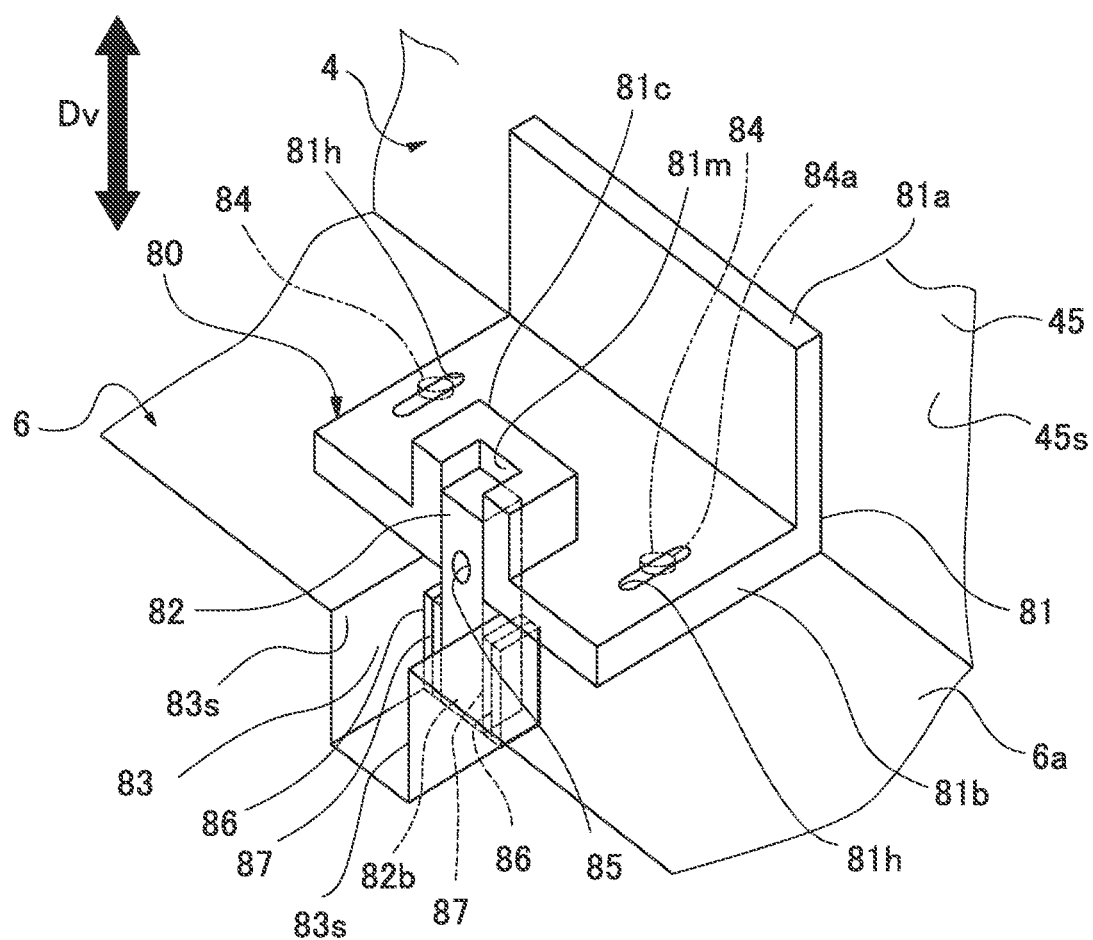
FIG. 3 is a perspective view showing the configuration of a gear support part provided in the compressor module according to the embodiment of this invention.

The gear support part 80 supports the transmission 4 with respect to the storage tank 6 so as to be relatively movable in the horizontal direction orthogonal to the vertical direction Dv. As shown in FIG. 3, the gear support part 80 is provided with a gear bracket 81, a gear key member 82, and a gear guide groove 83.

The gear bracket 81 is attached to a side surface 45s of the gear case 45 of the transmission 4. The gear bracket 81 integrally has a gear base part 81a fixed to the side surface 45s of the gear case 45 and a gear extending part 81b protruding in a direction away from the side surface 45s along the horizontal direction from the gear base part 81a.

A plurality of long holes 81h (two in the present embodiment) are formed in the gear extending part 81b so as to be continuous in a direction orthogonal to the side surface 45s of the gear case 45. The long hole 81h of the present embodiment is a long hole formed so as to extend in a direction away from the side surface 45s of the gear case 45. The gear extending part 81b of the gear bracket 81 is connected to the upper surface 6a of the storage tank 6 by a bolt 84 inserted through the long hole 81h. Here, each bolt 84 is attached such that a slight clearance is formed between the gear extending part 81b and a head part 84a of the bolt 84. As a result, the gear bracket 81 is movable in the direction in which the long hole 81h extends with respect to the storage tank 6 to which the bolt 84 is connected. As a result, the storage tank 6 is allowed to be displaced in the direction in which the long hole 81h extends with respect to the transmission 4. A gear block part 81c that has a rectangular parallelepiped shape is provided on the upper surface of the gear extending part 81b. The gear block part 81c is provided with a gear accommodating groove 81m recessed from the outside end surface of the gear block part 81c and extending in the vertical direction Dv.

The gear key member 82 is provided in one of the transmission 4 and the storage tank 6. The gear key member 82 of the present embodiment is provided in the transmission 4. The gear key member 82 is provided so as to protrude downwards in the vertical direction Dv from the gear extending part 81b. The gear key member 82 of the present embodiment is a member different from the gear bracket 81. The gear key member 82 has a rectangular parallelepiped shape extending in the vertical direction Dv. The upper part of the gear key member 82 is fixed to the gear block part 81c by a fixing screw 85 in a state of being accommodated in the gear accommodating groove 81m. A lower end part 82b of the gear key member 82 protrudes downwards in the vertical direction Dv from the gear extending part 81b.

The gear guide groove 83 is formed in the other of the transmission 4 and the storage tank 6. Since the gear key member 82 is provided in the transmission 4, the gear guide groove 83 of the present embodiment is formed in the storage tank 6 not provided with the gear key member 82. Specifically, the gear guide groove 83 is formed in the upper surface 6a of the storage tank 6. The gear guide groove 83 is formed so as to extend along the horizontal direction. The gear key member 82 can be inserted inside the gear guide groove 83. The gear guide groove 83 guides a movement of the inserted gear key member 82 in the horizontal direction.

The gear key member 82 is capable of performing a slide movement only in the horizontal direction in which the gear guide groove 83 extends by being guided in a state of being inserted in the gear guide groove 83. In other words, the transmission 4 provided with the gear bracket 81 to which the gear key member 82 is fixed is relatively movable with respect to the storage tank 6 only in the direction in which the gear guide groove 83 extends in the horizontal direction, and a movement of the transmission 4 in the groove width direction of the gear guide groove 83 is regulated.

The gear support part 80 further includes a gear liner member 86 and a gear shim member 87.

The gear liner member 86 is arranged between the gear key member 82 and the gear guide groove 83. The gear liner member 86 of the present embodiment is provided on both sides in the groove width direction of the gear guide groove 83 with respect to the gear key member 82. The gear liner member 86 is arranged so as to be in sliding contact with a lateral groove side surface (inner wall) 83s in the groove width direction of the gear guide groove 83. The gear liner member 86 is formed of a material having a smaller frictional force with respect to the gear guide groove 83 than the gear key member 82. The gear liner member 86 reduces the frictional force between the groove side surface 83s and the gear key member 82 that is generated when the gear key member 82 relatively moves along the gear guide groove 83.

The gear shim member 87 is arranged between the gear liner member 86 and the gear key member 82. The gear shim member 87 of the present embodiment is provided on both sides in the groove width direction of the gear guide groove 83 with respect to the gear key member 82. Accordingly, the gear shim member 87 is interposed between the gear key member 82 and the gear liner member 86 facing the lateral groove side surface 83s in the groove width direction of the gear guide groove 83. As a result, the gear shim member 87 presses the gear liner member 86 against the groove side surface 83s of the gear guide groove 83. The clearance between the gear liner member 86 and the groove side surface 83s can be adjusted by the gear shim member 87 being adjusted in thickness and number.

As shown in FIG. 2, the gear support part 80 as described above is provided on each of both sides in the axial direction Da and both sides in the width direction Dw with respect to the gear case 45 of the transmission 4.

Here, the gear support part 80 provided on each of both sides in the axial direction Da of the gear case 45 is referred to as a first gear support part 80A. In the first gear support part 80A, the gear extending part 81b extends in the axial direction Da from the side surface 45s of the gear case 45. Accordingly, in the first gear support part 80A, the long hole 81h also extends with length in the axial direction Da. In addition, in the first gear support part 80A, the gear guide groove 83 is arranged so as to extend in the axial direction Da. Further, when viewed from the vertical direction Dv, the first gear support part 80A is arranged so as to overlap the second axis C2, which is the rotation center of the second gear 44. More specifically, the first gear support part 80A is arranged such that the center of the groove width direction of the gear guide groove 83 overlaps the second axis C2.

The gear support part 80 provided on each of both sides in the width direction Dw of the gear case 45 is referred to as a second gear support part 80B. In the second gear support part 80B, the gear extending part 81b extends in the width direction Dw from the side surface 45s of the gear case 45. Accordingly, in the second gear support part 80B, the long hole 81h also extends with length in the width direction Dw. In addition, in the second gear support part 80B, the gear guide groove 83 is arranged so as to extend in the width direction Dw. Further, when viewed from the vertical direction Dv, the second gear support part 80B is arranged so as to overlap a center line Cg of the gear width direction of the second gear 44, and the width direction Dw corresponds to the direction in which the center line Cg extends. More specifically, the second gear support part 80B is arranged such that the center of the groove width direction of the gear guide groove 83 overlaps the center line Cg.

Figure 4:
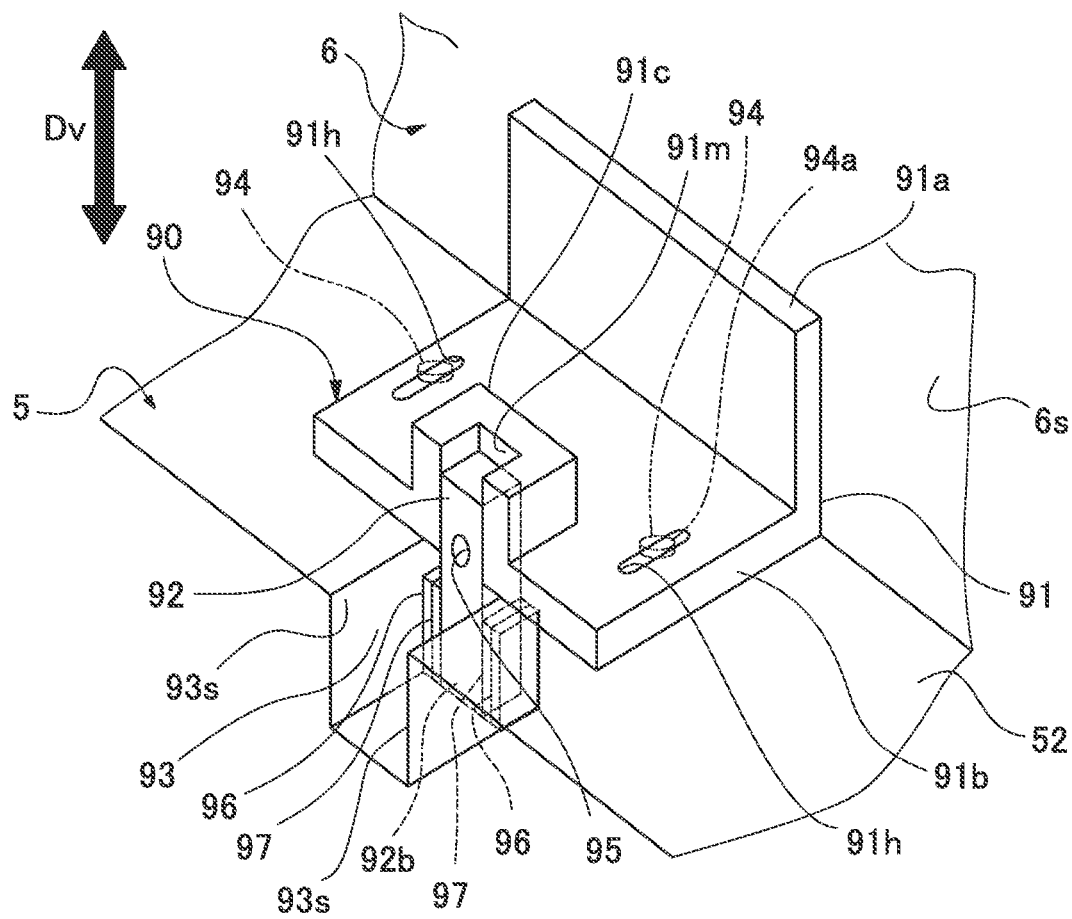
FIG. 4 is a perspective view showing the configuration of a tank support part provided in the compressor module according to the embodiment of this invention.

The storage tank 6 supporting the transmission 4 is attached to the beam parts 52 and the connecting members 53 via the tank support part 90 in a state of fitting between the beam parts 52 of the base plate 5. The tank support part 90 supports the storage tank 6 with respect to the base plate 5 so as to be relatively movable in the horizontal direction orthogonal to the vertical direction Dv. The tank support part 90 of the present embodiment is configured to have the same structure as the gear support part 80. As shown in FIG. 4, the tank support part 90 is provided with a tank bracket 91, a tank key member 92, and a tank guide groove 93.

The tank bracket 91 is attached to a side surface 6s of the storage tank 6. The tank bracket 91 integrally has a tank base part 91a fixed to the side surface 6s of the storage tank 6 and a tank extending part 91b protruding in a direction away from the side surface 6s along the horizontal direction from the tank base part 91a.

A plurality of long holes 91h (two in the present embodiment) are formed in the tank extending part 91b so as to be continuous in a direction orthogonal to the side surface 6s. The long hole 91h of the present embodiment is a long hole formed so as to extend in a direction away from the side surface 6s. The tank extending part 91b is connected on the beam part 52 of the base plate 5 by a bolt 94 inserted through the long hole 91h. Here, each bolt 94 is attached such that a slight clearance is formed between the tank extending part 91b and a head part 94a of the bolt 94. As a result, the tank bracket 91 is movable in the direction in which the long hole 91h extends with respect to the beam part 52 to which the bolt 94 is connected. As a result, the base plate 5 is allowed to be displaced in the direction in which the long hole 91h extends with respect to the storage tank 6. A tank block part 91c that has a rectangular parallelepiped shape is provided on the upper surface of the tank extending part 91b. The tank block part 91c is provided with a tank accommodating groove 91m recessed from the outside end surface of the tank block part 91c and extending in the vertical direction Dv.

The tank key member 92 is provided in one of the storage tank 6 and the base plate 5. The tank key member 92 of the present embodiment is provided in the storage tank 6. The tank key member 92 is provided so as to protrude downwards in the vertical direction Dv from the tank extending part 91b. The tank key member 92 of the present embodiment is a member different from the tank bracket 91. The tank key member 92 has a rectangular parallelepiped shape extending in the vertical direction Dv. The upper part of the tank key member 92 is fixed to the tank block part 91c by a fixing screw 95 in a state of being accommodated in the tank accommodating groove 91m. A lower end part 92b of the tank key member 92 protrudes downwards in the vertical direction Dv from the tank extending part 91b.

The tank guide groove 93 is formed in the other of the storage tank 6 and the base plate 5. Since the tank key member 92 is provided in the storage tank 6, the tank guide groove 93 of the present embodiment is formed in the base plate 5 not provided with the tank key member 92. Specifically, the tank guide groove 93 is formed in the upper surfaces of the beam part 52 and the connecting member 53 of the base plate 5. The tank guide groove 93 is formed so as to extend along the horizontal direction. The tank key member 92 can be inserted inside the tank guide groove 93. The tank guide groove 93 guides a movement of the inserted tank key member 92 in the horizontal direction.

The tank key member 92 is capable of performing a slide movement only in the horizontal direction in which the tank guide groove 93 extends by being guided in a state of being inserted in the tank guide groove 93. In other words, the storage tank 6 to which the tank bracket 91 that has the tank key member 92 is fixed is relatively movable with respect to the base plate 5 only in the direction in which the tank guide groove 93 extends in the horizontal direction, and a movement of the storage tank 6 in the groove width direction of the tank guide groove 93 is regulated.

The tank support part 90 further includes a tank liner member 96 and a tank shim member 97.

The tank liner member 96 is arranged between the tank key member 92 and the tank guide groove 93. The tank liner member 96 of the present embodiment is provided on both sides in the groove width direction of the tank guide groove 93 with respect to the tank key member 92. The tank liner member 96 is arranged so as to be in sliding contact with a lateral groove side surface (inner wall) 93s in the groove width direction of the tank guide groove 93. The tank liner member 96 is formed of a material having a smaller frictional force with respect to the tank guide groove 93 than the tank key member 92. The tank liner member 96 reduces the frictional force between the groove side surface 93s and the tank key member 92 that is generated when the tank key member 92 relatively moves along the tank guide groove 93.

The tank shim member 97 is arranged between the tank liner member 96 and the tank key member 92. The tank shim member 97 of the present embodiment is provided on both sides in the groove width direction of the tank guide groove 93 with respect to the tank key member 92. Accordingly, the tank shim member 97 is interposed between the tank key member 92 and the tank liner member 96 facing the lateral groove side surface 93s in the groove width direction of the tank guide groove 93. As a result, the tank shim member 97 presses the tank liner member 96 against the groove side surface 93s of the tank guide groove 93. The clearance between the tank liner member 96 and the groove side surface 93s can be adjusted by the tank shim member 97 being adjusted in thickness and number.

As shown in FIG. 2, the tank support part 90 as described above is provided on each of both sides in the axial direction Da and both sides in the width direction Dw with respect to the storage tank 6.

Here, the tank support part 90 provided on each of both sides in the axial direction Da of the storage tank 6 is referred to as a first tank support part 90A. In the first tank support part 90A, the tank extending part 91b extends in the axial direction Da from the side surface 6s of the storage tank 6. Accordingly, in the first tank support part 90A, the long hole 91h also extends with length in the axial direction Da. In addition, in the first tank support part 90A, the tank guide groove 93 is arranged so as to extend in the axial direction Da. Further, when viewed from the vertical direction Dv, the first tank support part 90A is arranged so as to overlap the second axis C2, which is the rotation center of the second gear 44. More specifically, the first tank support part 90A is arranged such that the center of the groove width direction of the tank guide groove 93 overlaps the second axis C2.

The tank support part 90 provided on each of both sides in the width direction Dw of the storage tank 6 is referred to as a second tank support part 90B. In the second tank support part 90B, the tank extending part 91b extends in the width direction Dw from the side surface 6s of the storage tank 6. Accordingly, in the second tank support part 90B, the long hole 91h also extends with length in the width direction Dw. In addition, in the second tank support part 90B, the tank guide groove 93 is arranged so as to extend in the width direction Dw. Further, when viewed from the vertical direction Dv, the second tank support part 90B is arranged so as to overlap the center line Cg of the gear width direction of the second gear 44, and the width direction Dw corresponds to the direction in which the center line Cg extends. More specifically, the second tank support part 90B is arranged such that the center of the groove width direction of the tank guide groove 93 overlaps the center line Cg.

In this manner, the direction in which the transmission 4 is movable relative to the storage tank 6 in the first gear support part 80A and the direction in which the storage tank 6 is movable relative to the base plate 5 in the first tank support part 90A are arranged on the same straight line when viewed from the vertical direction Dv. Likewise, the direction in which the transmission 4 is movable relative to the storage tank 6 in the second gear support part 80B and the direction in which the storage tank 6 is movable relative to the base plate 5 in the second tank support part 90B are arranged on the same straight line when viewed from the vertical direction Dv.

Figure 5:
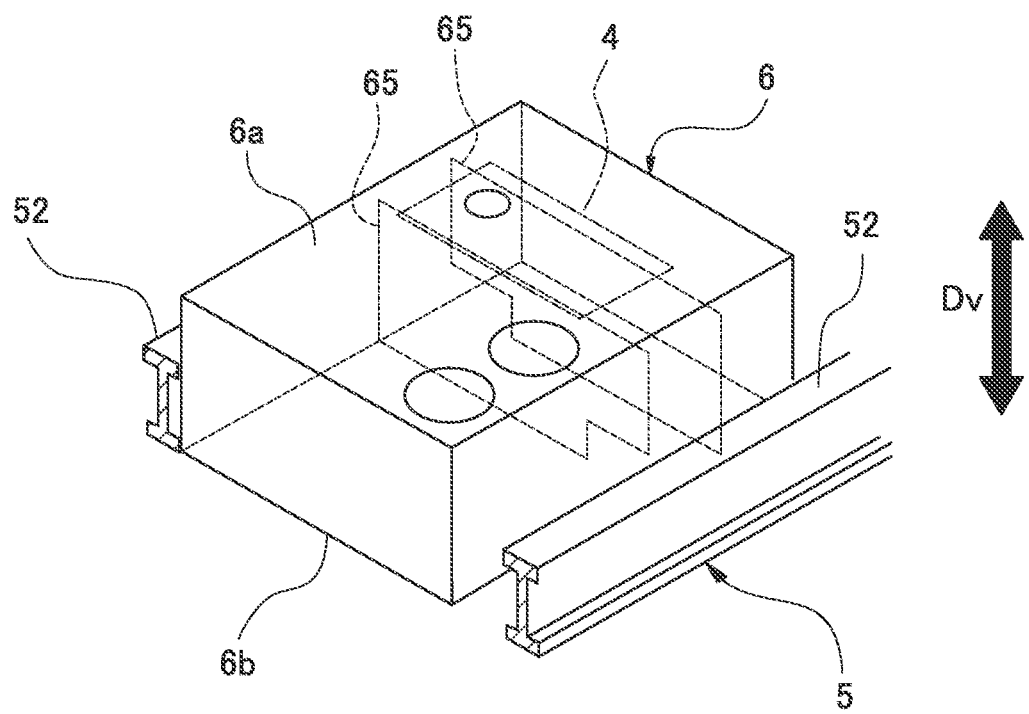
FIG. 5 is a perspective view showing a partition plate provided in a storage tank according to the embodiment of this invention.

As shown in FIG. 5, the storage tank 6 is provided with a partition plate 65. The partition plate 65 extends in the vertical direction Dv between the upper surface 6a and a lower surface 6b of the storage tank 6 and partitions the inside of the storage tank 6. The partition plate 65 forms a flow path for lubricating oil circulation in the storage tank 6 in order to, for example, shake and defoam the lubricating oil in the storage tank 6. With respect to the storage tank 6, the transmission 4 is arranged above the partition plate 65 in the vertical direction Dv.

In the compressor module 1 of the embodiment described above, the storage tank 6 is arranged below the transmission 4. Accordingly, an increase in the size of the compressor module 1 as a whole in the width direction Dw and the axial direction Da attributable to the storage tank 6 is suppressed. As a result, the compressor module 1 can be reduced in size.

During operation of the driving machine module 1, lubricating oil raised in temperature due to the frictional heat of the gear or the like flows into the storage tank 6. As a result, the temperature of the storage tank 6 itself rises and the storage tank 6 generates thermal elongation. The thermal elongation of the storage tank 6 may lead to a shift in the position of the transmission 4 installed above the storage tank 6. However, even in the event of the thermal elongation attributable to the inflow of the temperature-raised lubricating oil and the rise in the temperature of the storage tank 6, the gear support part 80 suppresses deformation of the storage tank 6 and a movement of the transmission 4 in the horizontal direction. As a result, it is possible to suppress a shift in the position of the transmission 4 attributable to the thermal elongation of the storage tank 6 and it is possible to suppress misalignment of the transmission 4 with respect to the driving machine 2 and the compressor 3. Accordingly, it is possible to suppress an impact of the thermal elongation of the storage tank 6 while reducing the size of the compressor module 1.

The gear key member 82 slides in the gear guide groove 83 although the position of the gear guide groove 83 moves once the storage tank 6 is deformed in the horizontal direction due to thermal elongation. Accordingly, the position of the transmission 4 connected to the gear key member 82 via the gear bracket 81 hardly moves. Suppressed as a result is a shift in the position of the transmission 4 with respect to the driving machine 2 and the compressor 3 that is entailed by deformation of the storage tank 6. Accordingly, a shift in the position of the transmission 4 attributable to the thermal elongation of the storage tank 6 is suppressed.

The gear support part 80 is provided with the first gear support part 80A having the gear guide groove 83 extending in the axial direction Da and the second gear support part 80B having the gear guide groove 83 extending in the width direction Dw. According to this configuration, it is possible to escape the impact of the horizontal deformation of the storage tank 6 that is attributable to thermal elongation in the width direction Dw by means of the second gear support part 80B while escaping the impact in the axial direction Da by means of the first gear support part 80A. Accordingly, it is possible to escape the deformation of the storage tank 6 in a dispersed manner in the axial direction Da and the width direction Dw, and a shift in the position of the transmission 4 that is attributable to the thermal elongation of the storage tank 6 is stably suppressed.

When viewed from the vertical direction Dv, the first gear support part 80A is arranged on the second axis C2, which is the rotation center of the second gear 44. Accordingly, it is possible to escape deformation of the storage tank 6 along the extension line of the second axis C2 by means of the first gear support part 80A. Suppressed as a result is the thermal elongation of the storage tank 6 causing the positional relationship between the transmission output shaft 42 and the rotor 31 to be shifted in the radial direction of the rotation axis thereof. Although even a slight positional shift is problematic in the transmission output shaft 42 and the rotor 31 that rotate at a high speed, the first gear support part 80A is capable of efficiently absorbing a positional shift according to the present embodiment. Accordingly, it is possible to effectively prevent the thermal elongation of the storage tank 6 from affecting the rotor 31 of the compressor 3, which is a driving object.

When viewed from the vertical direction Dv, the second gear support part 80B is arranged on the center line Cg of the gear width direction of the first gear 43 and the second gear 44. Accordingly, it is possible to escape deformation of the storage tank 6 along the extension line of the center line Cg by means of the second gear support part 80B. Suppressed as a result is the thermal elongation of the storage tank 6 causing the positional relationship between the first gear 43 and the second gear 44 to be shifted in the axial direction Da. Accordingly, the second gear support part 80B is capable of efficiently absorbing a positional shift, and thus it is possible to suppress an impact on engagement between the first gear 43 and the second gear 44.

The gear support part 80 is provided with the gear liner member 86. Accordingly, the gear key member 82 is capable of smoothly moving along the gear guide groove 83 in the gear support part 80. As a result, an impact attributable to the thermal elongation of the storage tank 6 can be efficiently suppressed.

The gear support part 80 further includes the gear shim member 87. Accordingly, by selecting the thickness of the gear shim member 87 during assembly of the compressor module 1, it is possible to absorb dimensional errors occurring during machining and assembly and it is possible to easily install the gear key member 82 in a state of being movable with respect to the gear guide groove 83.

Even in the event of thermal elongation and deformation of the storage tank 6, it is possible to suppress stress generation on the base plate 5 attributable to the deformation of the storage tank 6 by moving the storage tank 6 with respect to the base plate 5 by means of the tank support part 90. In addition, the storage tank 6 is capable of moving relative to the base plate 5 and the transmission 4 since the tank support part 90 is provided in addition to the gear support part 80. As a result, it is possible to suppress, with high accuracy, a horizontal shift in the position of the transmission 4 with respect to the driving machine 2 and the compressor 3 that is attributable to the thermal elongation of the storage tank 6. Accordingly, the impact of the thermal elongation of the storage tank 6 can be more effectively suppressed.

The tank key member 92 slides in the tank guide groove 93 although the position of the tank key member 92 moves once the storage tank 6 is deformed in the horizontal direction due to thermal elongation. Accordingly, the position of the base plate 5 does not change and the storage tank 6 connected to the tank key member 92 via the tank bracket 91 moves. As a result, no load is applied to the beam part 52 provided with the tank guide groove 93 as the storage tank 6 is deformed, and a shift in the position of the transmission 4 with respect to the driving machine 2 and the compressor 3 is suppressed. Accordingly, the thermal elongation of the storage tank 6 does not affect the base plate 5 and the transmission 4.

The tank support part 90 is provided with the first tank support part 90A having the tank guide groove 93 extending in the axial direction Da and the second tank support part 90B having the tank guide groove 93 extending in the width direction Dw. According to this configuration, it is possible to escape the impact of the horizontal deformation of the storage tank 6 that is attributable to thermal elongation in the width direction Dw by means of the second tank support part 90B and in the axial direction Da by means of the first tank support part 90A. Accordingly, it is possible to escape the deformation of the storage tank 6 in a dispersed manner in the axial direction Da and the width direction Dw, and an impact of the thermal elongation of the storage tank 6 on the base plate 5 and the transmission 4 is stably suppressed.

When viewed from the vertical direction Dv, the first tank support part 90A is arranged on the second axis C2, which is the rotation center of the second gear 44. Accordingly, it is possible to escape deformation of the storage tank 6 along the extension line of the second axis C2 by means of the first tank support part 90A. Suppressed as a result is the thermal elongation of the storage tank 6 causing the positional relationship between the transmission output shaft 42 and the rotor 31 to be shifted in the radial direction of the rotation axis thereof. A positional shift can be efficiently absorbed by the first tank support part 90A as well as the first gear support part 80A, and thus it is possible to more effectively prevent the thermal elongation of the storage tank 6 from affecting the rotor 31 of the compressor 3, which is a driving object.

When viewed from the vertical direction Dv, the second tank support part 90B is arranged on the center line Cg of the gear width direction of the first gear 43 and the second gear 44. Accordingly, it is possible to escape deformation of the storage tank 6 along the extension line of the center line Cg by means of the second tank support part 90B. Suppressed as a result is the thermal elongation of the storage tank 6 causing the positional relationship between the first gear 43 and the second gear 44 to be shifted in the axial direction Da. Accordingly, a positional shift can be efficiently absorbed by the second tank support part 90B as well as the second gear support part 80B, and thus it is possible to suppress an impact on engagement between the first gear 43 and the second gear 44 with high accuracy.

The tank support part 90 is provided with the tank liner member 96. Accordingly, the tank key member 92 is capable of smoothly moving along the tank guide groove 93 in the tank support part 90. As a result, an impact attributable to the thermal elongation of the storage tank 6 can be efficiently suppressed.

The tank support part 90 further includes the tank shim member 97. Accordingly, by selecting the thickness of the tank shim member 97 during assembly of the compressor module 1, it is possible to absorb dimensional errors occurring during machining and assembly and it is possible to easily install the tank key member 92 in a state of being movable with respect to the tank guide groove 93.

The first gear support part 80A and the first tank support part 90A and the second gear support part 80B and the second tank support part 90B are arranged so as to overlap on the same straight line when viewed from above in the vertical direction Dv. According to this configuration, in the event of thermal elongation of the storage tank 6, the relative displacement directions generated in the gear support part 80 and the tank support part 90 are matched with each other, and unexpected stress generation or the like in the storage tank 6 can be suppressed. In addition, it is possible to suppress a shift in the position of the transmission 4 with respect to the base plate 5.

In the vertical direction Dv, the transmission 4 is arranged above the partition plate 65 provided in the storage tank 6. According to this configuration, the load of the transmission 4 is also supported by the partition plate 65 in the storage tank 6, and thus the transmission 4 can be firmly supported.

By supporting the base plate 5 at three points by means of the first leg member 55A, the second leg member 55B, and the third leg member 55C, it is possible to suitably install the compressor module 1 on, for example, a deck of a ship where shaking occurs.

In the compressor module 1 integrally provided with the compressor 3, it is possible to block deformation attributable to thermal elongation of the storage tank 6 from affecting the surrounding equipment and it is possible to suppress misalignment of the transmission 4 with respect to the driving machine 2 and the compressor 3.

Although an embodiment of the present invention has been described in detail with reference to the drawings, each configuration in the embodiment, combinations thereof, and the like are merely examples, and additions, omissions, substitutions, and any other changes are possible with respect to the configurations without departing from the spirit of the present invention. In addition, the present invention is limited only by the claims and is not limited by the embodiment.

For example, although the transmission 4 is provided with the first gear 43 and the second gear 44, it is also possible to constitute a gear part by combining three or more gears.

Although the gear key member 82 is provided in the transmission 4 and the gear guide groove 83 is provided in the storage tank 6, the present invention is not limited to that configuration. Alternatively, the gear guide groove 83 may be provided in the transmission 4 and the gear key member 82 may be provided in the storage tank 6 in the compressor module 1.

Although the tank key member 92 is provided in the storage tank 6 and the tank guide groove 93 is provided in the base plate 5, the tank guide groove 93 may be provided in the storage tank 6 and the tank key member 92 may be provided in the base plate 5 instead.

Although the driving machine 2 is an electric motor according to the present embodiment, the driving machine 2 is not limited thereto insofar as the driving machine 2 is capable of driving the compressor 3. For example, the driving machine 2 may be a steam turbine or a gas turbine.

Although the compressor 3 is an exemplary example of a load device, any other piece of equipment may be used as the load device.

INDUSTRIAL APPLICABILITY

A size reduction can be achieved according to the above-described driving machine module.

REFERENCE SIGNS LIST

1 Compressor module (driving machine module)
2 Driving machine
3 Compressor (load device)
4 Transmission (gear part)
5 Base plate
6 Storage tank
6a Upper surface
6b Lower surface
6s Side surface
21 Output shaft
22A First drive bearing
22B Second drive bearing
31 Rotor (input shaft)
32A First compression bearing
32B Second compression bearing
41 Transmission input shaft
42 Transmission output shaft
43 First gear
44 Second gear
45 Gear case
45s Side surface
52 Beam part
53 Connecting member
55 Leg member
55A First leg member
55B Second leg member
55C Third leg member
65 Partition plate
80 Gear support part
80A First gear support part
80B Second gear support part
81 Gear bracket
81a Gear base part
81b Gear extending part
81c Gear block part
81h Long hole
81m Gear accommodating groove
82 Gear key member
82b Lower end part
83 Gear guide groove
83s Groove side surface
84 Bolt
84a Head part
85 Fixing screw
86 Gear liner member
87 Gear shim member
90 Tank support part
90A First tank support part
90B Second tank support part
91 Tank bracket
91a Tank base part
91b Tank extending part
91c Tank block part
91h Long hole
91m Tank accommodating groove
92 Tank key member
92b Lower end part
93 Tank guide groove
93s Groove side surface
94 Bolt
94a Head part
95 Fixing screw
96 Tank liner member
97 Tank shim member
100 Installation surface
C1 First axis
C2 Second axis
Cg Center line
Da Axial direction (first direction)
Dv Vertical direction
Dw Width direction (second direction)

What is claimed is:

1. A driving machine module comprising:
a driving machine having an output shaft driven to rotate about an axis;
a gear part having at least a first gear rotating integrally with the output shaft and a second gear which rotates integrally with an input shaft of a load device as a driving object and to which the rotation of the first gear is transmitted;
a storage tank arranged below the gear part in a vertical direction so as to support the gear part and storing lubricating oil used in the driving machine and the gear part;
a base plate supporting the driving machine and the storage tank; and
a gear support part supporting the gear part with respect to the storage tank so as to be relatively movable relative to the storage tank in a horizontal direction orthogonal to the vertical direction.

2. The driving machine module according to claim 1, wherein the gear support part includes
a gear key member provided in one of the gear part and the storage tank and extending in the vertical direction, and
a gear guide groove formed in the other of the gear part and the storage tank, the gear key member being inserted into the gear guide groove, and
wherein the gear guide groove is configured to guide a movement of the inserted gear key member in the horizontal direction.

3. The driving machine module according to claim 2, wherein the gear support part includes
a first gear support part where the gear guide groove extends in a first direction of the horizontal direction, and
a second gear support part where the gear guide groove extends in a second direction orthogonal to the first direction in the horizontal direction.

4. The driving machine module according to claim 3, wherein the first gear support part is arranged on an extension line of a rotation axis of one of the first gear and the second gear that rotates faster than the other when viewed from above in the vertical direction and the first direction is an axial direction in which the rotation axis extends.

5. The driving machine module according to claim 3, wherein the second gear support part is arranged on an extension line of a center line in a gear width direction of the first gear or the second gear when viewed from above in the vertical direction and the second direction corresponds to a direction in which the center line extends.

6. The driving machine module according to claim 2, further comprising a gear liner member arranged between the gear key member and the gear guide groove and having a smaller frictional force with respect to the gear guide groove than the gear key member.

7. The driving machine module according to claim 6, further comprising a gear shim member arranged between the gear liner member and the gear key member and pressing the gear liner member against an inner wall of the gear guide groove.

8. The driving machine module according to claim 1, further comprising a tank support part supporting the storage tank with respect to the base plate so as to be relatively movable in the horizontal direction.

9. The driving machine module according to claim 8, wherein the tank support part includes
a tank key member provided in one of the storage tank and the base plate and extending in the vertical direction, and
a tank guide groove formed in the other of the storage tank and the base plate, the tank key member being inserted into the tank guide groove, and
wherein the tank guide groove is configured to guide a movement of the inserted tank key member in the horizontal direction.

10. The driving machine module according to claim 9, wherein the tank support part includes
a first tank support part where the tank guide groove extends in a first direction of the horizontal direction, and
a second tank support part where the tank guide groove extends in a second direction orthogonal to the first direction in the horizontal direction.

11. The driving machine module according to claim 10, wherein the first tank support part is arranged on an extension line of a rotation axis of one of the first gear and the second gear that rotates faster than the other when viewed from above in the vertical direction and the first direction is an axial direction in which the rotation axis extends.

12. The driving machine module according to claim 10, wherein the second tank support part is arranged on an extension line of a center line in a gear width direction of the first gear or the second gear when viewed from above in the vertical direction and the second direction corresponds to a direction in which the center line extends.

13. The driving machine module according to claim 9, further comprising a tank liner member arranged between the tank key member and the tank guide groove and having a smaller frictional force with respect to the tank guide groove than the tank key member.

14. The driving machine module according to claim 13, further comprising a tank shim member arranged between the tank liner member and the tank key member and pressing the tank liner member against an inner wall of the tank guide groove.

15. The driving machine module according to claim 1, wherein
the storage tank is provided with a partition plate extending in the vertical direction and partitioning an inside of the storage tank, between an upper surface and a lower surface of the storage tank, and
the gear part is arranged above the partition plate in the vertical direction.

16. The driving machine module according to claim 1, wherein the base plate is supported at three points on an installation surface.

17. The driving machine module according to claim 1, further comprising a compressor as the load device.

* * * * *